(12) United States Patent
Difranco

(10) Patent No.: US 11,741,374 B1
(45) Date of Patent: Aug. 29, 2023

(54) JUDICATION ENGINE

(71) Applicant: Rockwell Collins, Inc., Cedar Rapids, IA (US)

(72) Inventor: Ian P. Difranco, Richardson, TX (US)

(73) Assignee: Rockwell Collins, Inc., Cedar Rapids, IA (US)

(*) Notice: Subject to any disclaimer, the term of this patent is extended or adjusted under 35 U.S.C. 154(b) by 273 days.

(21) Appl. No.: 17/077,128

(22) Filed: Oct. 22, 2020

(51) Int. Cl.
| | |
|---|---|
| *H04W 24/08* | (2009.01) |
| *G06F 17/11* | (2006.01) |
| *G06N 5/04* | (2023.01) |
| *G06N 5/01* | (2023.01) |
| *G06N 3/063* | (2023.01) |
| *H04W 84/18* | (2009.01) |
| *G06F 18/214* | (2023.01) |

(52) U.S. Cl.
CPC .............. *G06N 5/01* (2023.01); *G06F 17/11* (2013.01); *G06F 18/214* (2023.01); *G06N 3/063* (2013.01); *H04W 24/08* (2013.01); *H04W 84/18* (2013.01)

(58) Field of Classification Search
CPC ... G06N 5/01; G06N 3/063; G06F 17/11; G06F 18/214; H04W 24/08; H04W 84/18

See application file for complete search history.

(56) References Cited

U.S. PATENT DOCUMENTS

| | | |
|---|---|---|
| 10,039,016 B1 | 7/2018 | Larish et al. |
| 10,743,226 B2 | 8/2020 | Cizdziel et al. |
| 10,756,963 B2 | 8/2020 | Jung et al. |
| 2008/0293353 A1* | 11/2008 | Mody et al. ............. H04K 3/94 455/1 |
| 2017/0250751 A1 | 8/2017 | Kargieman et al. |
| 2017/0295582 A1* | 10/2017 | Gurney et al. ...... H04W 72/082 |
| 2019/0068443 A1 | 2/2019 | Li et al. |
| 2019/0228362 A1 | 7/2019 | Anagnostou et al. |
| 2019/0319868 A1* | 10/2019 | Svennebring et al. H04L 41/147 |
| 2020/0084777 A1 | 3/2020 | Ergen |
| 2020/0186227 A1 | 6/2020 | Reider et al. |
| 2021/0159971 A1* | 5/2021 | Panchal et al. ...... H04B 7/1855 |

FOREIGN PATENT DOCUMENTS

WO 2020033531 A1 2/2020

* cited by examiner

*Primary Examiner* — Shirley X Zhang
(74) *Attorney, Agent, or Firm* — Suiter Swantz pc llo

(57) ABSTRACT

An artificial intelligence engine is trained via a historical data set derived from communication events to and from mobile platforms under various environmental conditions. The artificial intelligence engine makes dynamic predictions about optimum available communications assets and settings over the entire available frequency spectrum. The artificial intelligence engine may determine and store a quality metric associated with each prediction. Such stored data is used to refine the artificial intelligence engine's predictive algorithms. The artificial intelligence engine is trained via analysis of linear and / or nonlinear equations, including partial differential equations, associating various factors to potential communication channels.

13 Claims, 4 Drawing Sheets

JUDICATION ENGINE

BACKGROUND

Mobile platforms such as aircraft include numerous radio assets, each with different capabilities and limitations. Those assets are increasingly used for various data communication functions. Existing methodologies for forecasting radio frequency communication links, circuit probability, and signal quality are multiple decades old, utilize static calculations for path loss, radio frequency propagation, link quality, etc., and are ill-suited to a dynamic environment. Those calculations don't account for aspects of the mobile platform, radio type, antenna, environmental conditions, interference between devices on the platform, loss in cabling, location of the mobile platform, etc. That lack of data reduces the quality / accuracy of the forecast output and usability across a variety of platforms. Furthermore, different calculations are utilized for different frequency ranges and different environmental conditions, increasing the incremental cost of transporting existing systems to new mobile platforms.

Current mobile platforms gather substantial, real-time data about their operating environment, and system level data about various communication architectures. It would be advantageous to have a system that utilized current and historical data collected from mobile platforms to make forecasting decisions about the communications environment for a desired data communication.

SUMMARY

In one aspect, embodiments of the inventive concepts disclosed herein are directed to a trained artificial intelligence engine. The artificial intelligence engine is trained via a historical data set derived from a plurality of communication events to and from a plurality of mobile platforms under a plurality of environmental conditions. The artificial intelligence engine makes dynamic predictions about optimum available communications assets and settings over the entire available frequency spectrum.

In a further aspect, the artificial intelligence engine may determine and store a quality metric associated with each prediction. Such stored data is used to refine the artificial intelligence engine's predictive algorithms.

In a further aspect, the artificial intelligence engine is trained via analysis of linear and / or nonlinear equations, including partial differential equations, associating various factors to potential communication channels.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
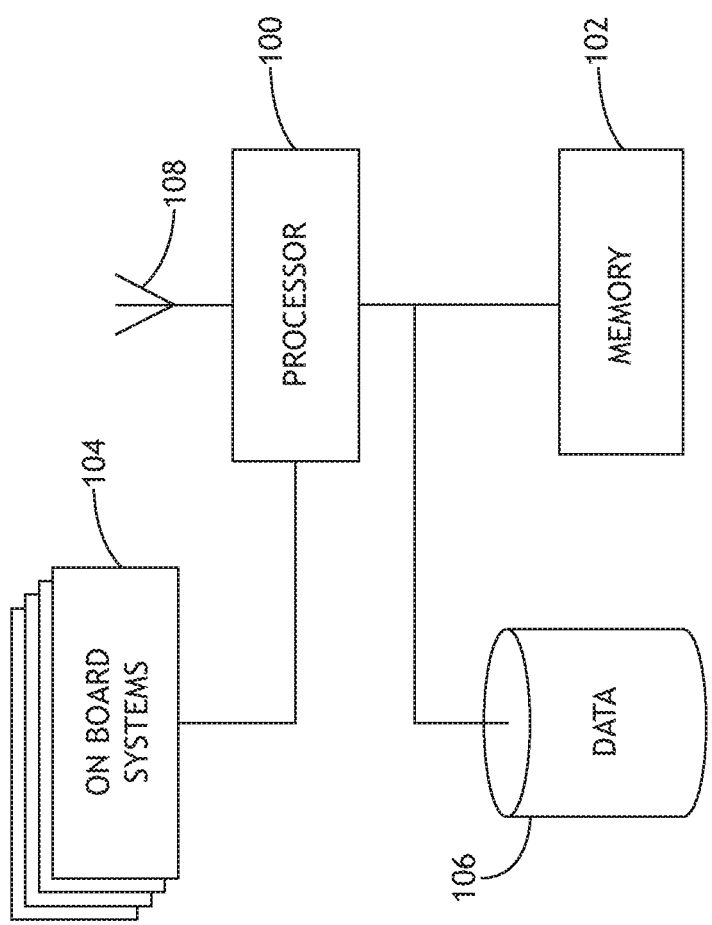
FIG. 1 shows a block diagram of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a trained artificial intelligence engine. The artificial intelligence engine is trained via a historical data set derived from a plurality of communication events to and from a plurality of mobile platforms under a plurality of environmental conditions. The artificial intelligence engine makes dynamic predictions about optimum available communications assets and settings over the entire available frequency spectrum. The artificial intelligence engine may determine and store a quality metric associated with each prediction. Such stored data is used to refine the artificial intelligence engine's predictive algorithms. The artificial intelligence engine is trained via analysis of linear and / or nonlinear equations, including partial differential equations, associating various factors to potential communication channels.

Referring to FIG. 1, a block diagram of a system for implementing an exemplary embodiment is shown. The system includes a processor 100, memory 102 for storing processor executable code, and a data storage element 106 for storing a data set and / or a set of functions for relating various data elements in the data set to one or more forecasts and / or predictions for a communication channel. In some embodiments, such system may be configured to instantiate and train an artificial intelligence engine (judication engine) via reference to the data set. In other embodiments, such system may be configured to embody a trained artificial intelligence engine to receive data points from a plurality of on-board systems 104 and set a communication channel via a communication element 108 based on a forecast of the highest quality communication channel settings. The data set includes data pertaining to the entire frequency spectrum, all potential platforms, both commercial and military, and communication assets. Forecasted outputs may include any adjustable feature of a communication channel such as the best frequency band, best frequency within the band at a specific position, best communication asset (radio and antenna), etc.

During training, a database of communication metrics and corresponding features of the communication system and environment are used to establish a set of functions that may be used in real-time to dynamically forecast an optimal communication channel (including the radio asset to be used, the frequency to be used, etc.) based on all available data (including fixed platform features, radio features, antenna features, environmental conditions, type of communication, etc.). Training may be by supervised, unsupervised, semi-supervised, reinforcement, or self-learning. The artificial intelligence engine may comprise an artificial neural network, a set of decision trees, vector machines, a Bayesian network, or some combination thereof.

In at least one embodiment, variables may be organized into classes such environmental (altitude, location, weather, time-of-day, sunspot activity, etc.), platform (platform type, platform capabilities, available communication assets on the platform, sources of interference on the platform, etc.), and system (radio properties, antenna properties, communication type, etc.). The training process may be trained via methodologies such as regression analysis to determine a best-fit relationship between certain input variables and a highest quality communication signal. It may be appreciated that certain training variables are actually invariant during operation; for example, platform variables may be broadly distributed in the data set but not subject to any variance when making an optimal communication channel forecast. By contrast, frequency selection with certain ranges may be highly variable when making such forecast. The training process may constrain certain variable accordingly; for example; a regression analysis or genetic algorithm may fix those invariants or perform such training on a subset of the dataset.

In at least one embodiment, the trained artificial intelligence engine may be configured to constrain forecasts based on those invariants; for example a decision tree eliminate all branches that do not correspond to the current platform, or a neural network may output a node weight of zero to any inputs that do not correspond to the current platform. In at least one embodiment, the artificial intelligence engine may comprise a mixed architecture; for example, a decision tree may be used to filter all invariants and arrive a decision tree leaf embodying a set of linear or non-linear equations, or a system of neural network nodes.

In at least one embodiment, where the system is embodied in a mobile platform and trained to make communication channel forecasts, the processor 100 may receive any data points available from on-board systems 104 on which the artificial neural network is trained. Such on-board systems 104 may include communication assets that provide data points such as the communication system's availability, features, detected interference, etc.; avionics systems including altimeters, radars, etc.; and on-board data stores of environmental status conditions. The artificial intelligence engine forecasts an optimal communication channel and configures the communication element 108 accordingly.

In at least one embodiment, the artificial intelligence engine may continuously or periodically forecast communication channels for various points in the future based on future locations along a known flight path with reference to one on the on-board systems 104. Such forecasting may include reference to projected weather conditions at those future locations.

In at least one embodiment, the trained artificial intelligence engine may utilize stored data and / or functions and equations to perform certain low-level analytical functions.

In at least one embodiment, the processor 100 is configured to associate a quality metric with each forecast. For example, the processor 100 may implement a communication channel based on a forecast, and then record a signal to noise ratio associate with the communication channel in the data storage element 106. Such quality metrics may be aggregated and later used to refine the operation of the artificial intelligence engine.

Figure 2:
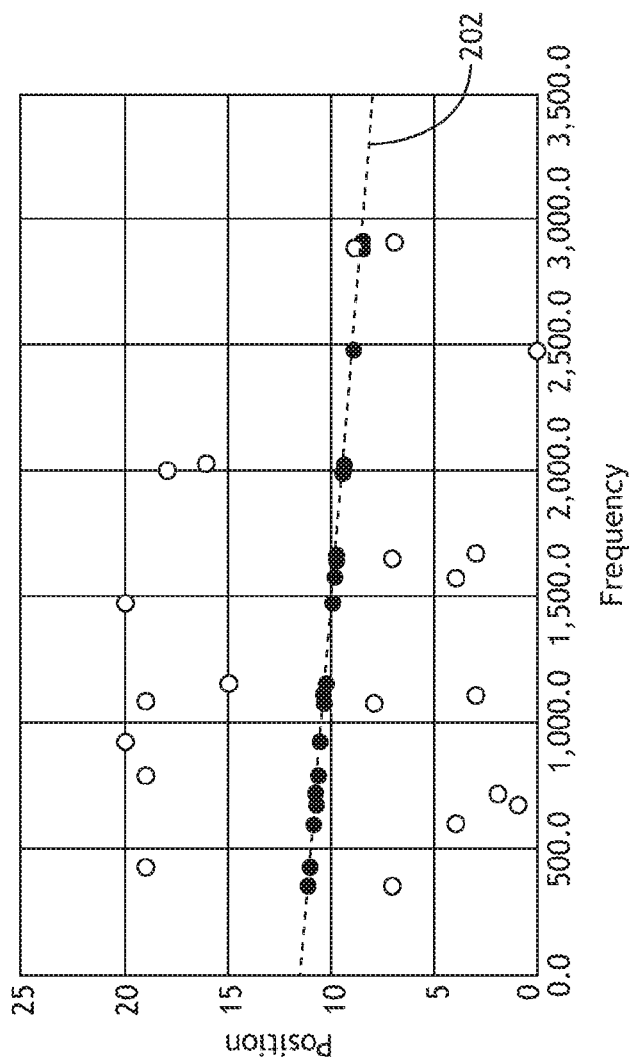
FIG. 2 shows a block representation of related factors in a judication engine according to an exemplary embodiment.
Figure 2:
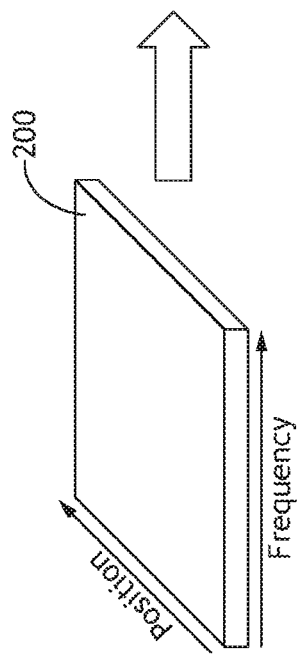

Referring to FIG. 2, a block representation of related factors in an artificial intelligence engine according to an exemplary embodiment is shown. The artificial intelligence engine collects and continuous updates relationships 200 between various factors; for example, mobile platform position and frequency. Each relationship 200 is specifically directed to link state: while all data related to features of a system, platform, and environment may be continuously collected, those features are only relevant to the artificial intelligence engine when there is an active link on at least one radio on the mobile platform. In this example, once an active link is detected, the artificial intelligence engine checks the position of the mobile platform, which may be represented as a single numeric value. For example, longitude and latitude may be converted to a single, deterministic value in the relationship 200 by computing a sum of longitude and latitude values (which may be normalized via truncation to a predetermined accuracy and multiplication to an integer value), and a difference of longitude and latitude values; the sum and difference values are converted to binary and interleaved; the interleaved value may be converted to a decimal value and an indication of any originally negative longitude and latitude values may be appended.

The calculated position value may be associated with a frequency decision in the relationship 200 via a previously determined relation 202 (such as a linear or non-linear relation 202), based on a previously analyzed large data set. In at least one embodiment, the exemplary relationship 200 comprises a first layer a multi-dimensional stack.

Figure 3:
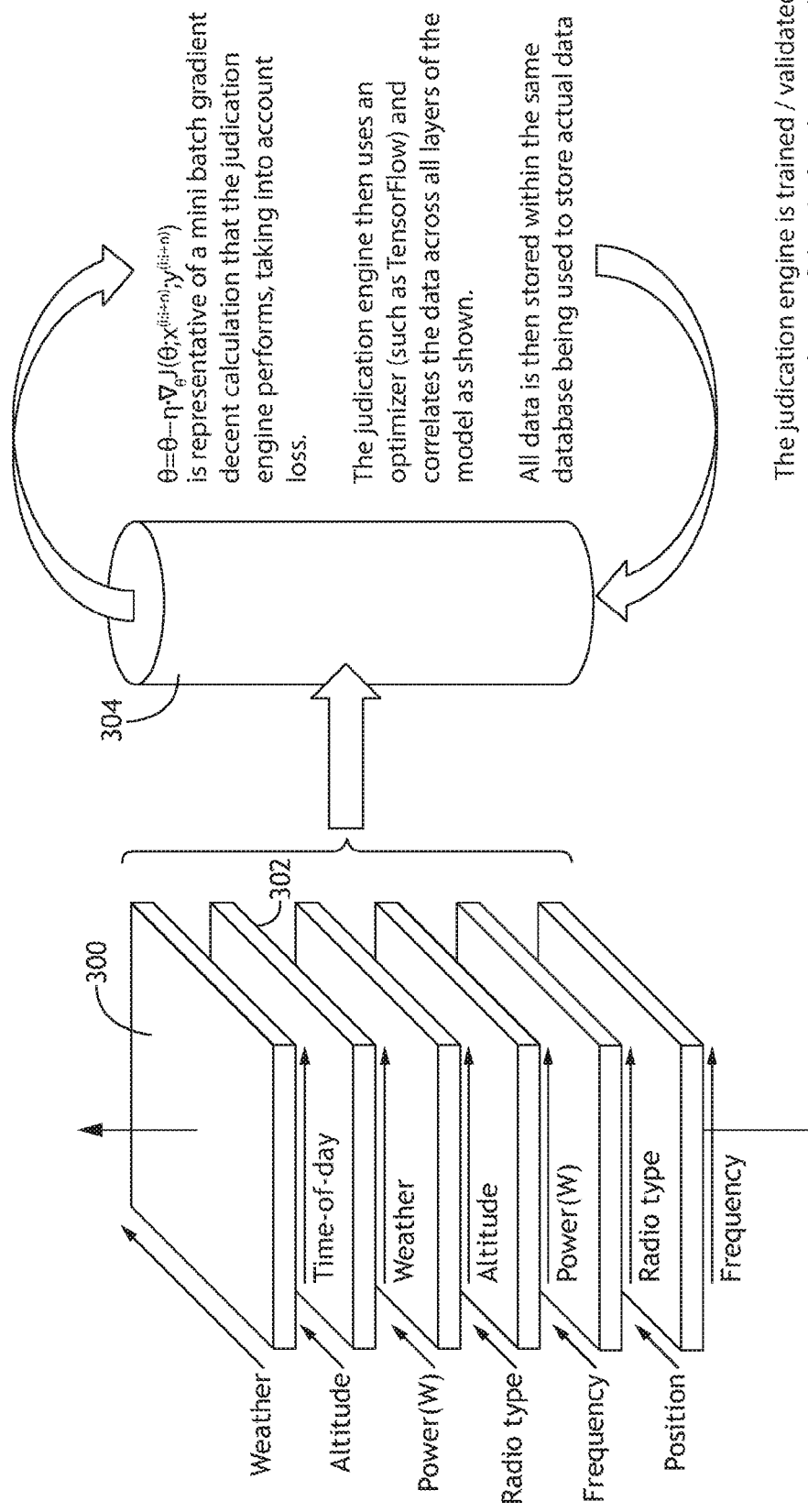
FIG. 3 shows a block representation of multiple layers of related factors in a judication engine according to an exemplary embodiment.

Referring to FIG. 3, a block representation of multiple layers of related factors in an artificial intelligence engine 304 according to an exemplary embodiment is shown. During a training process, a data set is organized into sets of relationships 300, 302 which may relate two or more data points corresponding to variables in the operating environment, including platform specific variables, radio or communication system specific variables, and environmental variable. In at least one embodiment, the relationships 300, 302 may be organized into hierarchical layers for the decision making / forecasting process; alternatively, the relationships 300, 302 may organized for parallel processing, or some hybrid approach wherein certain relationships are processed in series where the output of one layer is instrumental in a later layer.

The training process utilizes the organized data sets to train the artificial intelligence engine 304 via a process such as a mini batch gradient decent calculation to minimize forecasting error (the cost function; for example, $$1/N \sum_{i=1}^{N} (Y_i' \ Y_i)^2);$$

for example, a gradient decent equation such as $$\theta = \theta - \eta \cdot \nabla \theta J\left(\theta; x^{(i:i+n)}; y^{(i:i+n)}\right)$$

may be utilized for certain relationships 300, 302. Calculated outputs may be optimized and correlated across layers of relationships 300, 302, and then stored in a database for use in communication channel forecasting.

Figure 4:
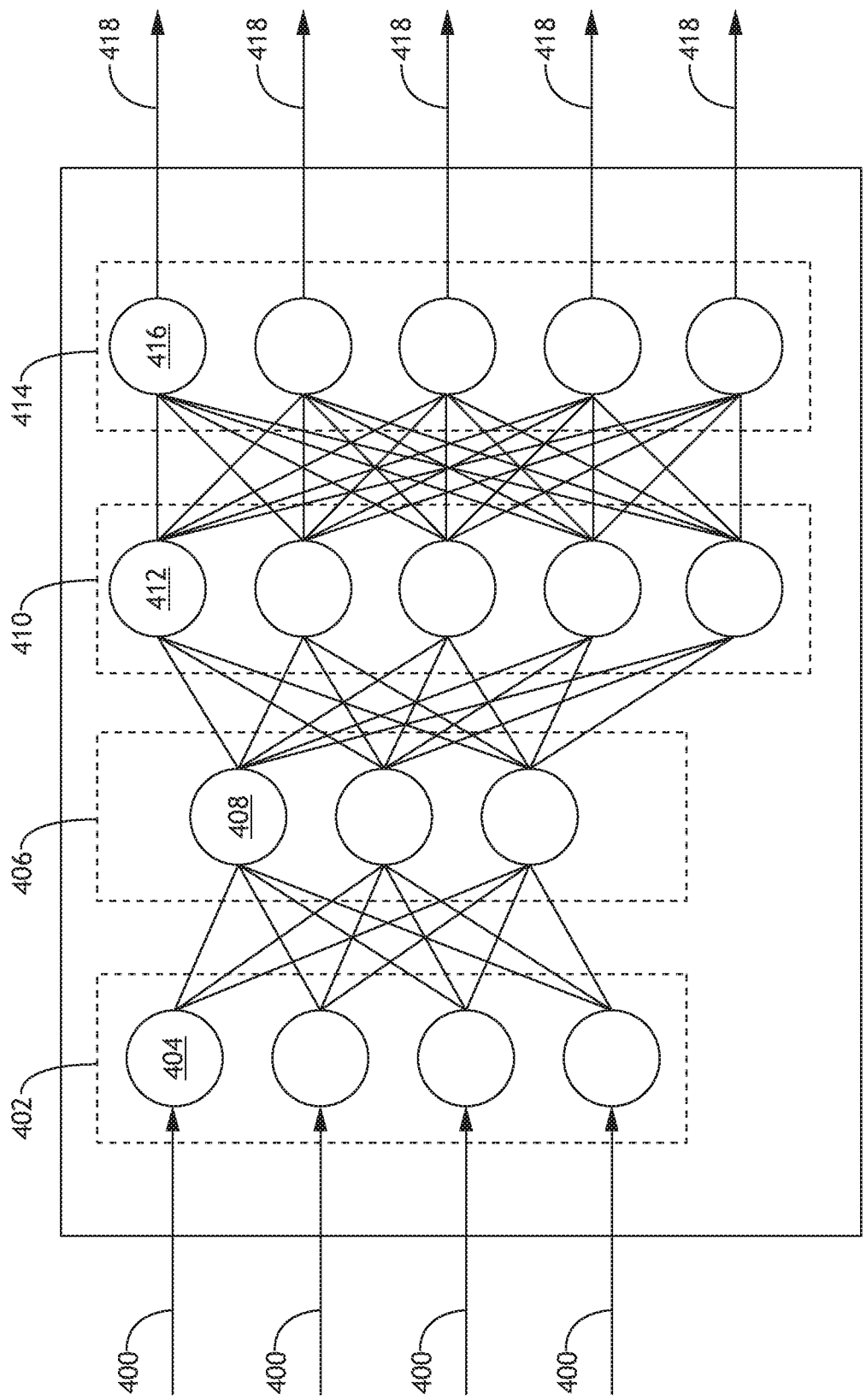
FIG. 4 shows a block representation of nodes in a neural network according to an exemplary embodiment.

Referring to FIG. 4, a block representation of nodes 404, 408, 412, 416 in a neural network according to an exemplary embodiment is shown. In at least one embodiment, an artificial intelligence engine embodied as a trained neural network may receive inputs 400 corresponding to any real-time or stored data points available to a mobile platform; processing layer 402, 406, 410, 414 may correspond to a hierarchical structure of variable relationships to produce outputs 418 corresponding to a forecasted optimal communication channel.

During supervised training, a designer may adjust one or more input biases or synaptic weights of the nodes 404, 408, 412, 416 in the one or more processing layers 402, 406, 410, 414 according to a loss function that defines an expected performance. Alternatively, or in addition, the designer may utilize certain training data sets, categorized as selection data sets, to choose a predictive model for use by the neural networks.

In at least one embodiment, training data sets may be categorized based on a defined level of stability or instability, and provided in ascending order of convergence or the number of disparate variables such that the disparities between stable and unstable approaches diminish during training and necessary adjustments presumably become smaller over time according to first and second order deviations of the corresponding loss function.

In at least one embodiment, the adjustments may be based on minimizing multidimensional loss functions, such as through first or second order derivatives. Alternatively, or in addition, the designers may iteratively simplify the process to focus on a single-dimension loss function at one time. Training algorithms suitable for embodiments of the present disclosure may include, but are not limited to, gradient descent where the loss function is iteratively limited to a single variable, Conjugate gradient, Newton's method, Quasi-Newton method, Levenberg-Marquardt, etc.

Embodiments of the present disclosure may provide a forecasting model useful for all all potential platforms, radio types (make, model, and configuration), antenna type and location, environmental conditions, temperature, interference between devices on the platform, loss in cabling, and location of the mobile platform. The forecasting model uses and updates live data and is portable from platform-to-platform; both commercial and military platform.

The judication engine embodies a machine learning algorithm that uses data concerning specific features collected over time from a platform to forecast communication link usability at any point in the future. Data sets are update based on actual data collected over an extended period of time and may augment traditional communication channel forecasting or replace them with sufficient data is available.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method of forecasting communication setting performance on a mobile platform comprising:
   receiving a plurality of real-time system specific data inputs from one or more systems on the mobile platform, system specific data inputs corresponding to features of communication assets;
   receiving a plurality of platform specific data inputs from a data storage element corresponding to invariant features of the mobile platform;
   receiving a plurality of environmental data inputs from one or more systems on the mobile platform;
   forecasting a communication performance of a plurality of potential communication settings based on one or more of the system specific data inputs, the platform specific data inputs, and the environmental data inputs via an artificial intelligence engine; and
   determining communication settings for a communication event based on the forecasted communication performance, wherein:
   the artificial intelligence engine is organized as a hybrid structure with sets of hierarchical layers;
   within each hierarchical layer, layers are processed in series;
   the sets of hierarchical layers are processed in parallel; and
   each layer corresponds to a relationship between two or more distinct variables.

2. The method of claim 1, further comprising:
   determining one or more quality metrics associated with the determined communication settings; and recording the one or more quality metrics, determined communication settings, and data inputs.

3. The method of claim 2, further comprising updating the artificial intelligence engine via the recorded one or more quality metrics.

4. The method of claim 1, wherein:
the artificial intelligence engine is organized as a decision tree trained to determine one or more multivariable functions via branching according to at least one of the data inputs; and
the one or more multivariable functions produce at least a frequency band forecast.

5. The method of claim 1, further comprising:
determining one or more future communication channels based on a known flight plan of the mobile platform and one or more forecasted data inputs at a future location and time along the known flight plan; and
storing the one or more future communication channels for future reference.

6. A mobile platform including a system for forecasting a communication setting performance, the system comprising:
a plurality of on-board systems, each configured to produce a stream of data inputs;
one or more communication assets; and
at least one processor in data communication with the plurality of on-board systems, the one or more radios, and a memory storing processor executable code for configuring the at least one processor to:
receive a plurality of real-time system specific data inputs from the one or more communication assets, each corresponding to features of the corresponding communication asset;
receive a plurality of platform specific data inputs from a data storage element corresponding to invariant features of the mobile platform;
receive a plurality of environmental data inputs from the plurality of on-board systems;
forecasting a communication performance of a plurality of potential communication settings based on one or more of the system specific data inputs, the platform specific data inputs, and the environmental data inputs via an artificial intelligence engine; and
determine communication settings for a communication event based on the forecasted communication performance, wherein:
the artificial intelligence engine is organized as a hybrid structure with sets of hierarchical layers;
within each hierarchical layer, layers are processed in series;
the sets of hierarchical layers are processed in parallel; and
each layer corresponds to a relationship between two or more distinct variables.

7. The mobile platform of claim 6, wherein the system specific data inputs comprise data pertaining to: a type and location of an antenna of associated with each communication asset and communication capabilities of each communication asset.

8. The mobile platform of claim 6, wherein the artificial intelligence engine comprises one of a set of artificial intelligence engines, each trained to operate with a set of platform invariant features.

9. The mobile platform of claim 6, wherein the at least one processor is further configured to:
determine one or more quality metrics associated with the determined communication settings; and
record the one or more quality metrics, determined communication settings, and data inputs.

10. The mobile platform of claim 9, wherein the at least one processor is further configured to update the artificial intelligence engine via the recorded one or more quality metrics.

11. The mobile platform of claim 6, wherein:
the artificial intelligence engine is organized as a decision tree trained to determine one or more multivariable functions via branching according to at least one of the data inputs; and
the one or more multivariable functions produce at least a frequency band forecast.

12. The mobile platform of claim 11, wherein the one or more multivariable functions are determined during training via batch gradient descent.

13. The mobile platform of claim 6, wherein the at least one processor is further configured to:
determine one or more future communication channels based on a known flight plan of the mobile platform and one or more forecasted data inputs at a future location and time along the known flight plan; and
store the one or more future communication channels for future reference.

* * * * *